United States Patent [19]

Fukano et al.

[11] 4,182,375

[45] Jan. 8, 1980

[54] SPOOL-SLEEVE TYPE CHANGE-OVER VALVE

[75] Inventors: Yoshihiro Fukano; Naotake Oneyama, both of Soka, Japan

[73] Assignee: Shoketsu Kinzoku Kogyo Kabushiki Kaisha, Tokyo, Japan

[21] Appl. No.: 945,057

[22] Filed: Sep. 22, 1978

[30] Foreign Application Priority Data

May 13, 1978 [JP] Japan .............................. 53-64153[U]

[51] Int. Cl.² ............................................. F15B 13/044
[52] U.S. Cl. ............................ 137/625.69; 137/625.65
[58] Field of Search ....................... 137/625.65, 625.69

[56] References Cited

U.S. PATENT DOCUMENTS

| 3,323,549 | 6/1967 | Carrington | 137/625.69 |
| 3,342,213 | 9/1967 | Walters | 137/625.69 |
| 3,952,775 | 4/1976 | Ogata | 137/625.69 X |

FOREIGN PATENT DOCUMENTS

| 2608701 | 9/1977 | Fed. Rep. of Germany | 137/625.69 |
| 569829 | 6/1945 | United Kingdom | 137/625.69 |

Primary Examiner—Gerald A. Michalsky
Attorney, Agent, or Firm—Haight & Huard

[57] ABSTRACT

In a spool-sleeve type change-over valve, the axial width of the intake passage is reduced relative to that of the discharge passage within a range in which the same cylinder response as attained by intake and discharge passages of the same axial width is retained.

1 Claim, 3 Drawing Figures

SPOOL-SLEEVE TYPE CHANGE-OVER VALVE

BACKGROUND OF THE INVENTION

This invention relates to a spool-sleeve type change-over valve, and more particularly to a spool-sleeve type change-over valve which is provided with fluid intake and discharge passages of particular dimensions to attain a high cylinder response at a given stroke length of the spool or to attain a given cylinder response at a shorter stroke length.

Spool-sleeve type change-over valves generally consist of a casing having a fluid intake port, first and second output ports located on the opposite sides of the fluid intake port and first and second discharge ports located on the outer sides of the respective output ports, a sleeve fixedly fitted in the casing to define a cylindrical valve chamber and having rows of circumferentially aligned apertures, including intake apertures, output apertures and discharge apertures, respectively in open communication with the intake, output and discharge ports in the casing, and a spool slidably fitted in a cylindrical valve chamber and having lands slidable across the intake and discharge apertures of the sleeve to switch the fluid flows.

In this type of change-over valve, the intake and discharge apertures of the sleeve which communicate with the intake and discharge ports in the casing are usually formed to have equal widths in the axial direction of the sleeve and the spool is operated through a stroke length corresponding to the width of the intake apertures plus the width of the discharge apertures.

However, as a result of exhaustive experiments on the relationship between the open widths of the respective apertures and the response velocity of the working cylinders which are connected to the output ports, it has been found that under light load conditions the cylinder response is primarily governed by the effective sectional area of the discharge passage rather than that of the intake passage, and that there is a certain range in which the effective sectional area of the intake passage can be reduced relative to that of the discharge passage without lowering the cylinder response as compared with the velocity which would be obtained by the use of intake and discharge passages of the same effective sectional areas.

SUMMARY OF THE INVENTION

It is an object of the present invention to provide a spool-sleeve type change-over valve which is provided with a fluid intake passage of a reduced effective sectional area as compared with its fluid discharge passages and yet which can assure the same cylinder response as would be attained by a valve with intake and discharge passages of the same effective sectional areas. In other words, the object of the present invention resides in the provision of a spool-sleeve type change-over valve which can attain a higher cylinder response at a given stoke length of the spool or which can attain a given cylinder response at a shorter stroke length.

According to the present invention, there is provided a spool-sleeve type change-over valve comprising: a cylindrical casing provided with a fluid intake port, a pair of output ports located one on each side of the intake port, and a pair of discharge ports located on the outer sides of the respective output ports; a sleeve fixedly fitted in the casing and internally defining a cylindrical valve chamber, the sleeve being provided with rows of circumferentially aligned apertures including intake apertures, output apertures and discharge apertures respectively in open communication with the intake, output and discharge ports in the casing; a spool slidably received in the sleeve and having a center land slidable across the intake apertures to connect the intake port with either one of the output ports and a pair of discharge control lands slidable across the discharge apertures to communicate the disconnected output port with the corresponding discharge port; actuators provided at the opposite ends of the casing to shift the spool between two change-over positions thereof; the intake apertures having an axial width reduced relative to that of the discharge apertures in a range in which cylinders connected to the respective output port retain the same response velocity as attained by intake and discharge apertures of equal axial widths.

The above and other objects, features and advantages of the invention will become apparent from the following description, taken in conjunction with the accompanying drawings which show by way of example a preferred embodiment of the invention.

DESCRIPTION OF PREFERRED EMBODIMENT

Figure 1:
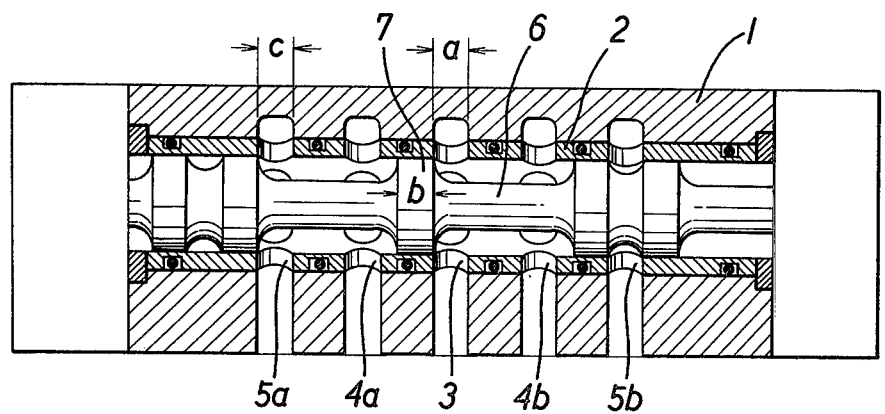
FIG. 1 is a diagrammatic sectional view of a conventional spool-sleeve type change-over valve.

Referring to FIG. 1, there is shown a conventional spool-sleeve type change-over valve, wherein a sleeve 2 which is fitted within a valve casing 1 is provided with a fluid intake port 3, output ports 4a and 4b connectible to the respective working cylinders and discharge ports 5a and 5b, and the fluid flows between these ports are switched by the lands of a spool 6 which is slidably received in the sleeve 2. In this type of change-over valve, the fluid intake port 3, discharge ports 5a and 5b and land 7 of the spool 6 are normally formed to have dimensions of a=b=c wherein a and c are widths in the axial direction of the fluid intake port 3 and the discharge ports 5a and 5b, respectively, and b the width of the switching land 7 on the spool 6, requiring the spool 6 to have a stroke length s of a+b=2c. The stroke length of the spool and the axial width of the discharge ports are thus in the restrictive relation with each other, i.e. the axial width of the discharge ports should be c when s=2c.

As mentioned hereinbefore, the response velocity of the cylinder is predominantly governed by effective sectional area of the discharge passage rather than that of the fluid intake passage under light load conditions. In addition, minimization of the effective sectional area of the fluid intake passage is possible in a certain range without sacrificing the cylinder response as would be obtained by the use of a fluid intake passage which has the same effective sectional area as the exhaust passages.

Figure 2:
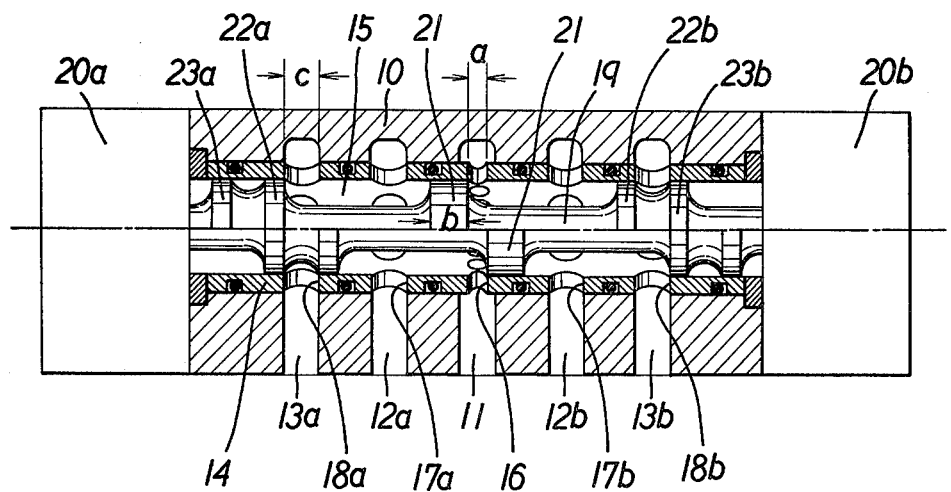
FIG. 2 is a diagrammatic sectional view of a spool-sleeve type change-over valve according to the present invention, showing the spool in two different change-over positions in the upper and lower halves of the section.

FIG. 2 illustrates a longitudinal section of a spool-sleeve type change-over valve according to the present invention, with the upper and lower halves of the spool being located in the two different change-over positions for the convenience of explanation. Similarly, this change-over valve has a casing 10 which is provided with output ports 12a and 12b and discharge ports 13a and 13b on the opposite sides of a centrally located fluid intake port 11. A sleeve 14 which is fixedly fitted in the casing 10 and which internally defines a cylindrical valve chamber 15 is provided with circumferentially aligned intake apertures 16, output apertures 17a and 17b and discharge apertures 18a and 18b in open communication with the above-mentioned fluid intake port 11, output ports 12a and 12b, and discharge ports 13a and 13b of the casing 10, respectively.

A spool 19 which is slidably fitted in the valve chamber 15 is driven by operators 20a and 20b provided at the opposite ends of the casing 10. The spool 19 is centrally provided with a land 21 which is slidable across the intake apertures 16 to communicate the same selectively with the output apertures 17a or 17b. The spool 19 is further provided in the opposite end portions thereof with discharge control lands 22a and 22b which are slidable across the discharge apertures 18a and 18b, respectively, for selectively establishing or blocking the communication between the discharge apertures 18a and output apertures 17a and between the discharge apertures 18b and output apertures 17b, in cooperation with outer auxiliary lands 23a and 23b.

In this instance, the dimensions of the respective apertures of the sleeve 14 and the stroke length s of the spool 19 are:

$$c = b > a$$

$$s = a + c < 2c$$

where a and c are the axial widths of the intake apertures 16 and the discharge apertures 18a and 18b, respectively, which govern the stroke length s, and b is the width of the center land 21 of the spool 19. The output apertures 17a and 17b which have no direct relation with the stroke length a so that they are formed to have a sufficient sectional open area.

In blocking the discharge apertures 18a and 18b, the discharge lands 22a and 22b engage the marginal edge portions on the inner side of the discharge apertures 18a or 18b over the width a while the outer auxiliary lands 23a and 23b engages the marginal edge portions on the outer side of the discharge apertures 18a or 18b over a width which is necessary for ensuring appropriate sealing. In the embodiment shown in FIG. 2, the discharge and auxiliary lands 22 and 23 are formed independently of each other but they may be provided as one integral land if desired.

In the upper half of FIG. 2, the spool 19 is shifted to the left by the operator 20a or 20b to assume a first change-over position, communicating the intake 11 with one output port 12b through the intake apertures 16, valve chamber 15 and output apertures 17b of the sleeve 14 while connecting the other output port 12a with the discharge port 13a through the output apertures 17a, valve chamber 15 and discharge apertures 18a.

Under these circumstances, if the spool 19 is shifted to the right by the operator 20a or 20b to assume a second change-over position shown in the lower half of FIG. 2, the fluid intake port 11 is communicated with the output port 12a to switch the fluid flow thereto, connecting the cylinder output port 12b with the discharge port 13b. In this switching operation, the spool is shifted through a stroke length $s = a + b$ which is shorter than the stroke length $s = 2c$ in the conventional change-over valve shown in FIG. 1.

Figure 3:
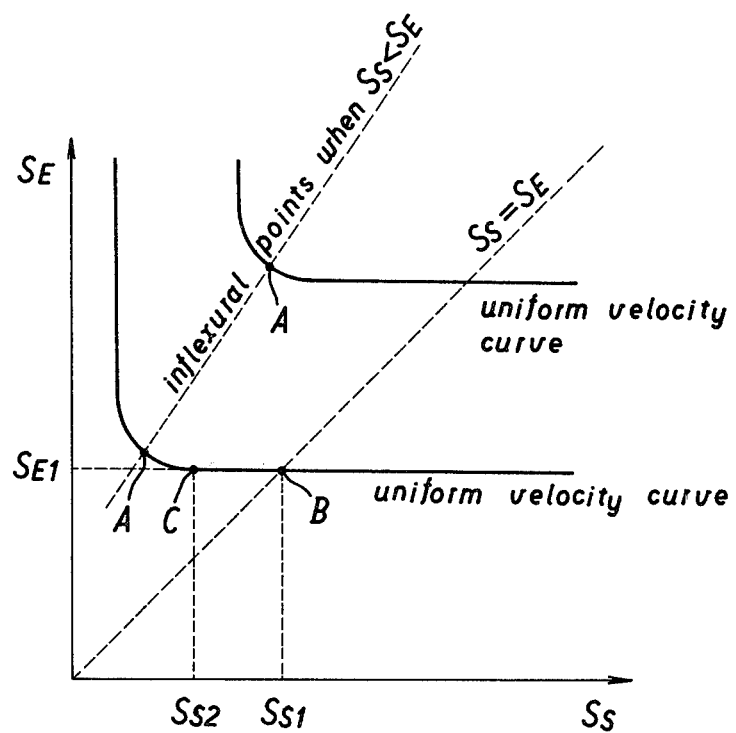
FIG. 3 is a graph showing uniform velocity curves of the working cylinder in relation with the effective sectional areas of the intake and output ports of the valve.

According to experiments under light load conditions, the response velocity of the air cylinder which is controlled by the change-over valve is predominantly governed by the effective sectional area $S_E$ of the exhaust passage leading from the output port 12a or 12b to the exhaust port 13a or 13b rather than the effective sectional area $S_S$ of the intake passage leading from the intake port 11 to the output port 12a or 12b. The uniform velocity curves of the cylinder piston assume the form of a hyperbola when plotted on an orthogonal coordinates system having $S_S$ and $S_E$ on the horizontal and vertical axes, as shown in FIG. 3. The line which connects the inflexural points of the respective uniform velocity curves lies largely to the left of the line of $S_S = S_E$. The piston speed is mainly governed by $S_E$ in the region on the right or lower side of the line which connects the points of inflexion and by $S_S$ in the region on the left or upper side of the just-mentioned line. For instance, where the intake air pressure is 5 bars, the critical point in the response velocity of an unloaded cylinder is at $S_E = 5 \times S_S$. The piston is operated at the same speed both at point B where $S_{S1} = S_{E1}$ and at point C where $S_{S2} < S_{S1}$. This means that the effective sectional area $S_S$ of the intake passage can be reduced within a predetermined range while retaining the same cylinder response velocity as will be attained when $S_S = S_E$. In other words, the value of $S_S$ can be reduced relative to $S_E$ within a range which retains a cylinder response velocity comparable to that of $S_S = S_E$.

Thus, according to the present invention, there is provided a spool-sleeve type change-over valve with $c > a$ and $s = a + c < 2c$, which gives the performance comparable to that of those valves with $a = c$ and $s = a + c = 2c$. Namely, it becomes possible to obtain a higher response rating for a given stroke length due to the increase of $S_E$. In addition, the valve construction according to the invention functions as if a quick discharge valve were provided between the cylinder and the change-over valve.

It will be appreciated from the foregoing description that the valve construction according to the invention is smaller in size but ensures a higher response rating when compared to conventional valves of the same class.

What is claimed is:

1. A spool-sleeve type change-over valve comprising:
   a cylindrical casing provided with a fluid intake port, a pair of output ports located one on each side of said intake port, and a pair of discharge ports located respectively on the outer sides of said output ports;
   a sleeve fixedly fitted in said casing and internally defining a cylindrical valve chamber, said sleeve being provided with rows of circumferentially aligned apertures including intake apertures, output apertures and discharge apertures respectively in open communication with said intake, output and discharge ports in said casing;
   a spool slidably received in said sleeve and having a center land slidable across said intake apertures to connect said intake port with either one of said output ports and a pair of discharge control lands slidable across said discharge apertures to communicate the disconnected output port with the corresponding discharge port; and operators provided at the opposite ends of said casing to shift said spool between two change-over positions thereof;

each of said intake apertures having an axial width less than the axial width of said discharge apertures, the axial width of said intake apertures being within the range of widths which will permit cylinders connected to said output ports to attain the same response velocity that is attained when the intake and discharge apertures all have equal axial widths.

* * * * *